United States Patent
Badgley

(10) Patent No.: US 10,997,601 B1
(45) Date of Patent: May 4, 2021

(54) METHODS AND SYSTEMS FOR CHILD SUPPORT PAYMENT

(71) Applicant: INFORMATIX, INC., Sacramento, CA (US)

(72) Inventor: Robert Badgley, St. Johns, MI (US)

(73) Assignee: Informatix, Inc., Sacramento, CA (US)

( * ) Notice: Subject to any disclaimer, the term of this patent is extended or adjusted under 35 U.S.C. 154(b) by 33 days.

(21) Appl. No.: 16/786,950

(22) Filed: Feb. 10, 2020

(51) Int. Cl.
*G06Q 20/40* (2012.01)
*G06Q 50/18* (2012.01)
*G06Q 40/02* (2012.01)

(52) U.S. Cl.
CPC ........... *G06Q 20/405* (2013.01); *G06Q 40/02* (2013.01); *G06Q 50/18* (2013.01)

(58) Field of Classification Search
CPC .. G06Q 20/40; G06Q 20/405; G06Q 20/4012; G06Q 20/325
USPC .......................................................... 705/44
See application file for complete search history.

(56) References Cited

U.S. PATENT DOCUMENTS

| | | |
|---|---|---|
| 7,752,131 B1 | 7/2010 | Polk |
| 7,814,011 B1 | 10/2010 | Wilkins |
| 2002/0169718 A1 | 11/2002 | Alsofrom |
| 2005/0137972 A1 | 6/2005 | Krumlauf |
| 2012/0109820 A1* | 5/2012 | Galit ............... G06Q 20/105 705/41 |
| 2013/0066754 A1* | 3/2013 | Atwood ............ G06Q 50/10 705/30 |

OTHER PUBLICATIONS

STIC Search (Year: 2020).*

* cited by examiner

*Primary Examiner* — Bennett M Sigmond
*Assistant Examiner* — Michael D Cranford
(74) *Attorney, Agent, or Firm* — Kanika Radhakrishnan; Evergreen Valley Law Group

(57) ABSTRACT

Systems and methods for enabling a non-custodial parent to purchase goods and service directly from merchants for a child while getting acknowledgement and consideration under a child support program for the purchased goods and services from the merchant. The method includes receiving an obligation file from an entity associated with a child support case. The obligation file includes information related to obligation agreement and obligation amount between a custodial parent and the non-custodial parent of the child. A unique ID is generated for both the custodial parent and the non-custodial parent, and a common account is created for both the custodial parent and the non-custodial parent with a merchant using the unique ID. The method facilitates delivery of an item or service to the custodial parent, via the merchant using the common account, and payment of the item or service is performed by the non-custodial parent using the common account.

20 Claims, 10 Drawing Sheets

METHODS AND SYSTEMS FOR CHILD SUPPORT PAYMENT

TECHNICAL FIELD

The present disclosure relates to child support payment and disbursement processing and, more particularly to, methods and systems for providing good and services purchased from a merchant directly to the custodial party of a child who is registered under a child support program.

BACKGROUND

Every government takes care of child development in their country and provides several plans to fulfill every child's needs including those whose parents have separated lawfully. In case of divorced couples, one of the parents, who does not live with the child permanently and provides financial support to the child, is termed as "non-custodial parent or non-custodial party (NCP)", whereas the parent with whom the child is staying is termed as "custodial parent or custodial party (CP)". There are certain government rules and norms under which a financial agreement is made between the CP and the NCP for the sake of development of the child. For example, the government may document the terms and condition of the financial agreement which includes an amount of money the non-custodial parent (NCP) is supposed to give to the custodial parent (CP).

Currently the NCPs can only make direct, monetary child support payments using one of the several options available such as online payment, pay by phone, pay in cash or check, pay at a local child support office, or pay through the state's child support website. Using the technology available today, an NCP may purchase goods or services directly from a merchant and ask for its acknowledgment from the government, however it is a one-time process and next time again for another purchase the NCP has to ask for its acknowledgment. Therefore, currently there are no technical solution in place that allows a state's child support system to receive regular updates for any child support related purchases made by the NCP from a third-party supplier without the need of NCP explicitly sending the details of the purchase and without the need of explicit acknowledgment from CP for receipt of the goods or service purchased from NCP from the merchant. Currently, CPs receive child support payments from the NCPs through a state's Child Support payment system in the form of a check, cash or money transfer via payment cards. Current technology does not allow the NCPs to make a payment, which complies with support obligations as per government law, using any other method. No other form of payment option is currently offered to NCPs for making child support. Hence, there exists a need for technological solutions to improve the child support payment process.

SUMMARY

Various embodiments of the present disclosure provide systems, and methods, for providing goods and services purchased by the non-custodial parent from a merchant directly to the custodial party of a child who is registered under a child support program.

In an embodiment, a computer implemented method facilitated by a direct support system is disclosed. The method includes receiving an obligation file from an entity associated with a child support case. The obligation file includes information related to an obligation agreement and an obligation amount between a custodial parent and a non-custodial parent of a child enrolled for the child support case. The method further includes electronically generating a unique identification number (ID) for both the custodial parent and the non-custodial parent based on the received obligation file from the entity. The method further includes registering both the custodial parent and the non-custodial parent with the direct support system based on the unique ID. The method further includes creating a common account of both the custodial parent and the non-custodial parent with a merchant using the unique ID. The method further includes facilitating delivery of at least one item or service to the custodial parent, via the merchant using the common account. A payment of the at least one item or service is performed by the non-custodial parent using the common account, and the at least one item or service is selected by the custodial parent using the common account.

In another embodiment, a system is disclosed. The system includes a memory comprising stored instructions and at least one processor configured to execute the stored instructions to cause the system to perform a method. The method includes receiving an obligation file from an entity associated with a child support case. The obligation file includes information related to an obligation agreement and an obligation amount between a custodial parent and a non-custodial parent of a child enrolled for the child support case. The method further includes electronically generating a unique identification number (ID) for both the custodial parent and the non-custodial parent based on the received obligation file from the entity. The method further includes registering both the custodial parent and the non-custodial parent with the system based on the unique ID. The method further includes creating a common account of both the custodial parent and the non-custodial parent with a merchant using the unique ID. The method further includes facilitating delivery of at least one item or service to the custodial parent, via the merchant using the common account. A payment of the at least one item or service is performed by the non-custodial parent using the common account, and the at least one item or service is selected by the custodial parent using the common account.

In yet another embodiment, another computer implemented method facilitated by a direct support system is disclosed. The method includes receiving an obligation file from an entity associated with a child support case. The obligation file includes information related to an obligation agreement and an obligation amount between a custodial parent and a non-custodial parent of a child enrolled for the child support case. The method further includes electronically generating a unique identification number (ID) for both the custodial parent and the non-custodial parent based on the received obligation file from the entity. The method further includes registering both the custodial parent and the non-custodial parent with the direct support system based on the unique ID. The method further includes generating a redacted obligation file from the obligation file based on eliminating personal information of the custodial parent and the non-custodial parent from the obligation file. The method includes sending the redacted file along with a connection request to a merchant for setting a link with the merchant. The method further includes creating a common account of both the custodial parent and the non-custodial parent with the merchant using the unique ID. The method further includes facilitating delivery of at least one item or service to the custodial parent, via the merchant using the common account, wherein a payment of the at least one item or service is performed by the non-custodial parent using the common account, and wherein the at least one item or service is selected by the custodial parent using the common account.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
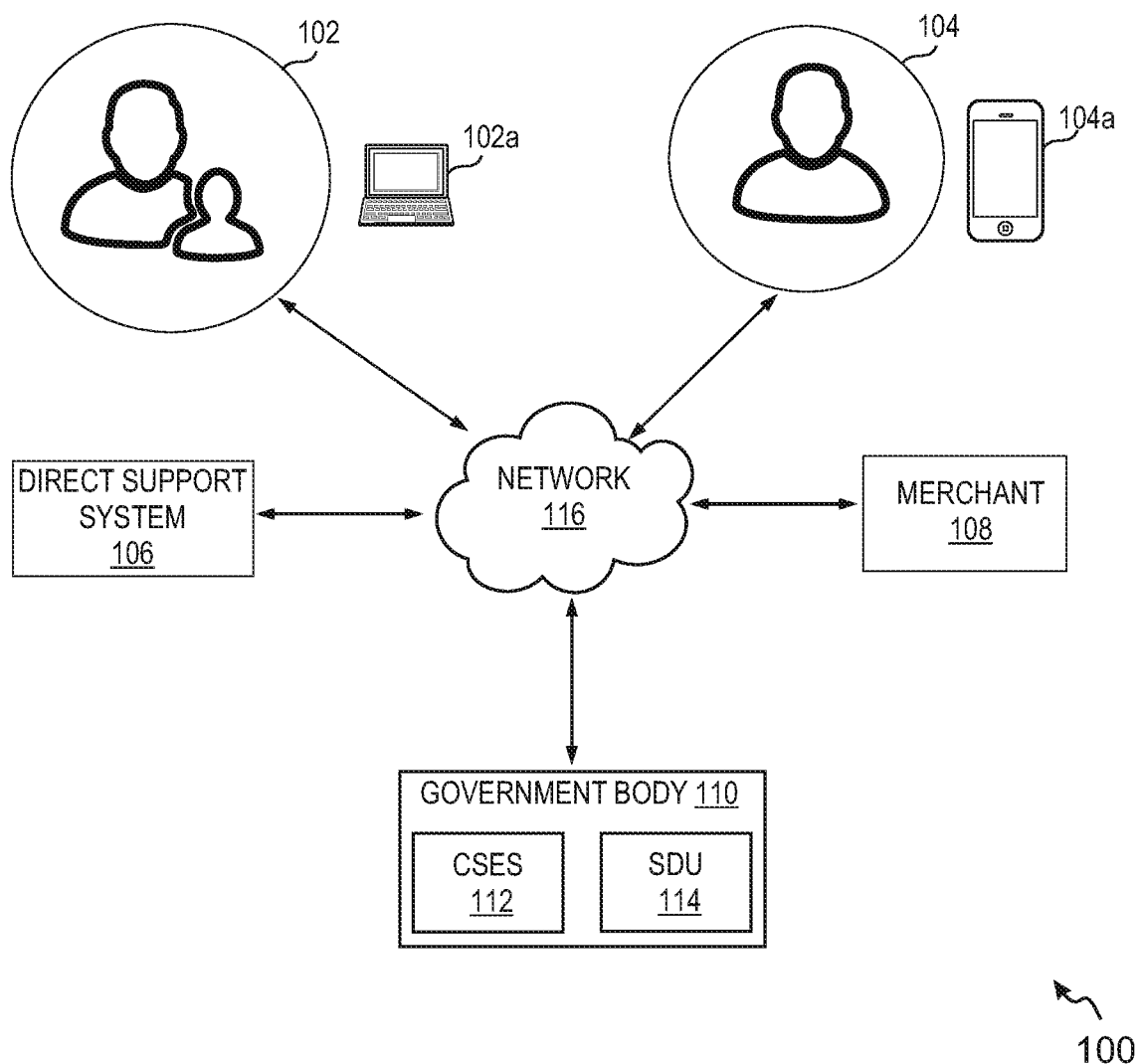
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "custodial parent or custodial party (CP)" used throughout the description, refers to the parent who is given physical or legal custody of a child by court order. Physical custody designates where the child will actually live, whereas legal custody gives the custodial person(s) the right to make decisions for the child's welfare.

The term "non-custodial parent or non-custodial party (NCP)" used throughout the description, refers to the parent who does not have physical custody of his or her minor child as the result of a court order. Generally, when the child only lives with one parent, in a sole custody arrangement, then the non-custodial parent is typically required to pay child support, and visitation is arranged. However, alternatively, a child support arrangement can also be implemented in a shared custody, and either of the parent can be the non-custodial parent required to pay child support.

The term "acquiring server" used throughout the description refers to a server that holds a financial account of a merchant or any entity which receives the fund from the payee. Examples of the acquiring server include, but are not limited to a bank, electronic payment portal such as PayPal®, and a virtual money payment portal. The financial accounts in the acquiring server may be associated with an entity such as an individual person, a family, a commercial entity, a company, a corporation, a governmental entity, a non-profit organization and the like. In some scenarios, the financial account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card includes, but are not limited to, debit cards, credit cards, prepaid cards, digital wallet, virtual payment numbers, virtual card numbers, forex card, charge cards and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

Various example embodiments of the present disclosure provide methods and systems for enabling a non-custodial parent to purchase goods and services directly from merchants for a child while getting acknowledgement and consideration under a child support program for the purchased goods and services directly from the merchant. More specifically, techniques disclosed herein enable tracking of goods and services purchased by the non-custodial parent for the child from a merchant and further enables deduction in an obligation amount which the non-custodial parent is supposed to pay the custodial parent under the child support program. The deduction in the obligation amount is based on value of the purchased goods and services. The value of the purchased goods or service comprises selling price of the product or the service, service fees, shipping fees, tax etc. In some cases, if agreed by both parties, the shipping fee must be approved by the CP or paid separately from the child support obligation to prevent the NCP from unnecessarily spending child support funds.

In an example embodiment, government is running a child support program in which cases are registered where the child needs support collectively from two different parties, which are custodial party (interchangeably referred as custodial parent) (CP) and non-custodial party (interchangeably referred non-custodial parent) (NCP) under the child support program. The registered cases may be like, child of divorced couple or an under-privileged child. In a non-limiting manner, the government bodies taking care of the registered cases are child support enforcement system (CSES) and state disbursement unit (SDU). The CSES keeps the record of an obligation agreement under the law between the CP and NCP for the welfare of the child, and the obligation agreement includes details such as rights responsibilities of each party (CP or NCP) over the child, an obligation amount which the NCP is supposed to provide to the CP for the welfare of the child and a duration in which the obligation agreement is valid. The CSES also updates the obligation agreement based on any changes in the recorded details of the obligation agreement, such as the obligation amount, etc. The SDU takes care of payment processing between the NCP and the CP, and also updates the CSES regarding the payment processing. The NCP may purchase goods and services needed for the child from a third-party provider (hereinafter, "merchant").

In an example embodiment, the government bodies (CSES and SDU), the CP, the NCP and the merchant are inter-connected to each other via a direct support (DS) system. The CSES sends an obligation file related to the obligation agreement to the DS system in a pre-defined period, for example CSES sends the obligation file to DS system daily or once in two days. The obligation file includes, but is not limited to information such as a case identifier, the obligation amount, personal details of the CP, details of the NCP, details of the child, the date of creation of the obligation agreement, or the date of dissolution of the obligation agreement. The DS system stores the obligation file. The DS system registers both the CP and NCP with the DS system by creating a common direct support (DS) account for both the CP and NCP. A DS account number (interchangeably termed as "unique ID") is given to both the CP and the NCP. The unique ID is appended by CP's name and the obligation amount. The DS system maps the unique ID with the case identifier and stores in a database associated with the DS system.

In an example embodiment, the DS system generates a redacted obligation file from the obligation file shared by the CSES. The DS system sends the redacted obligation file to the merchant along with a connection request to get linked with the DS system under the child support program. The merchant may accept or reject the connection request. The DS system gets linked with the merchant. The CP and the NCP may access the merchant website (hosted by the merchant) directly using the unique ID. Alternatively, the merchant website link may also be accessed via the DS account. The CP may also access the merchant website using a mobile application.

In an example embodiment, the CP accesses the merchant website by logging in using a username and the unique ID provided at the time of registration with the DS system. The CP selects items or services required for the child and adds them in a product card of the merchant web site. After adding the items or services, the CP logs out from the merchant website. The NCP also accesses the merchant website by logging using the username and the unique ID provided at the time of registration with the DS system. The NCP checks the product cart and decides items or services for which payment should be made, based on the added items and services by the CP. The merchant enables delivery of the purchased items or services to the CP. Post payment of the items or services, the merchant generates an obligation fulfilment file related to the purchase of the items or services. The obligation fulfilment file (hereinafter termed as "OFF file") includes data elements such as CP/NCP identifiers such as respective usernames, total payment amount, date of purchase and details of the items or services. The merchant sends the generated OFF file to the DS system. The DS system receives the OFF file and links the OFF file with the case identifier based on mapping the unique ID with the corresponding case identifier stored in the database. The DS system sends the updated OFF file to the appropriate SDU. The SDU validates the details of the received OFF file and accordingly updates the respective obligation file based on the purchase amount spent by the NCP for the goods or services purchased from the merchant. The SDU sends the updated obligation file to the CSES. In an alternate embodiment, the DS system can share the OFF file directly with the CSES. The CSES records the updated obligation file and share it with the DS system.

Therefore, the above explained process of child support payment is an efficient and traceable method of converting monetary payments into goods and services to be delivered to the child in fulfillment of the child support obligation in a lawful manner.

FIG. 1 illustrates an exemplary representation of an environment 100, in which at least some example embodiments of the present disclosure can be implemented. The environment 100 is exemplarily shown including a custodial party 102 including a custodial parent and a child, a user device 102a associated with the custodial party 102, a non-custodial party 104, a user device 104a associated with the non-custodial party 104, a direct support system 106, a third-party provider 108 (also referred to herein as 'a merchant 108'), a government body 110 including a CSES 112

(interchangeably termed as "CSES 112") and a SDU 114 (interchangeably termed as "SDU 114"), and a network 116. In some example embodiments, the merchant 108 may include a merchant facility or merchant terminal (not shown). Examples of the merchant facility or merchant terminal may include a merchant website hosted by the merchant 108, or a mobile application managed by the merchant 108.

The user devices 102a or 104a may be a portable user device. Examples of the portable user devices 102a and 104a include, but are not limited to, a smart phone, a personal digital assistant (PDA), and a laptop, among others. In some embodiments, the user devices 102a or 140a may be a non-portable user device. Examples of the non-portable user devices 102a and 104a include a personal computer (PC) and a kiosk, among others. The user devices 102a and 104a may be a device that the user (e.g., the custodial party 102 or the non-custodial party 104) operates to browse a website and to perform a transaction.

The direct support (DS) system 106 may be a server system configured to provide support for enabling acknowledgment of exchange of goods or service between the custodial party 102 (hereinafter, "CP 102") and the non-custodial party 104 (hereinafter, "NCP 104") under law enforced obligation agreement for child support.

In an example embodiment, the CSES 112 of the government body 110 sends, in a pre-defined period of time, an obligation file related to child support case to the DS system 106. The obligation file may include, but is not limited to, information, such as a case identifier, an obligation amount, details of the CP, details of the NCP, details of the child, a date of creation of the obligation agreement, or a date of dissolution of the obligation agreement. The DS system 106 stores the obligation file in a database along with the case identifier. The DS system 106 registers both the CP 102 and NCP 104 with the DS system 106 by creating a common direct support (DS) account for both the CP 102 and NCP 104. The DS system 106 generates a DS account number (interchangeably termed as "unique ID") for both the CP and the NCP, which is appended by the CP's name and the obligation amount. The DS system 106 maps the generated unique ID with the case identifier and stores in the database associated with the DS system 106. The DS system 106 provides the unique ID and respective usernames to the CP 102 and NCP 104 to access the DS account.

In an example embodiment, the DS system 106 generates a redacted obligation file from the obligation file shared by the CSES 112. The redacted obligation file is generated by removing some personal details of the CP 102 and the NCP 104 from the obligation file. The DS system 106 sends the redacted obligation file to the merchant 108 along with a connection request to get linked with the DS system 106 under the child support program. The merchant 108 may accept or reject the connection request. When the merchant 108 accepts the connection request, the DS system 106 gets linked with the merchant 108. Based on the connection between the DS system 106 and the merchant 108, the CP 102 and the NCP 104 may access the merchant website (hosted by the merchant 108) directly using the unique ID and their respective username. Alternatively, the merchant website link may also be accessed via the DS account. The CP 102 may also access the merchant website using a mobile application.

In an example embodiment, the CP 102, via the user device 102a, accesses the merchant website by logging using the username and the unique ID provided at the time of registration with the DS system 106. The merchant 108 sends a validation request to the DS system 106 for authorizing the access for the CP 102. The DS system 106 matches the details provided by the CP 102 with pre-stored information related to a plurality of registered CPs with the DS system 106. When the details (username and the unique ID) matches with the pre-stored information, the DS system 106 provides approval to the merchant 108. Post receiving the approval from the DS system 106, the merchant 108 allows the CP 102 to access the merchant website. The CP 102 selects items or services required for the child and adds them in a product card of the merchant website. After adding the items or services, the CP 102 logs out from the merchant website.

In another example embodiment, the NCP 104, via the user device 104a, accesses the merchant website by logging using the respective username and the unique ID. The merchant 108 also authenticates the NCP 104 based on the same method as explained above for CP 102. Post successful authentication, the merchant 108 allows the NCP 104 to access the merchant website. The NCP 104 checks the product cart and makes payment for the added items and services by the CP 102. In an alternate embodiment, the NCP may select items or services from the added items and services, and pay only for the selected items or services rather than paying for all the added items and services in the product cart. In an alternate or additional embodiment, the CP 102 and the NCP 104 may also access the merchant website via the DS account which is created commonly for both the CP 102 and the NCP 104. The DS account includes links related to the merchants linked with the DS system 106. The CP 102 accordingly selects the merchant 108 and gets redirected to the merchant website based on the selection. Similarly, the NCP 104 can also login, via the user device 104a, to the DS account and checks the merchant 108 via the DS system 106 for making payment for the items and services. When the CP 102 and the NCP 104 are accessing the merchant website via the DS system 106 then they do not need to re-enter their details at the merchant website.

The merchant 108 enables delivery of the purchased items or services to the CP 102. Post payment of the items or services, the merchant 108 generates an obligation fulfilment file related to the purchase of the items or services. The obligation fulfilment file (hereinafter termed as "OFF file") includes, but is not limited to, the following data elements, for example, CP/NCP identifiers such as respective usernames, total payment amount, date of purchase and details of the items or services. The merchant 108 sends the generated OFF file to the DS system 106. Upon receiving the OFF file, the DS system 106 links the OFF file with the case identifier based on the mapping of the unique ID with the corresponding case identifier stored in the database.

The DS system 106 sends the updated OFF file to the SDU 114. The SDU 114 validates the details of the received OFF file and accordingly updates the respective obligation file based on the purchase amount spend the NCP 104 for the goods or services purchased from the merchant 108. The SDU 114 sends the updated obligation file to the CSES 112. In an alternate embodiment, the DS system 106 can share the OFF file directly with the CSES 112. The CSES 112 records the updated obligation file and share it with the DS system 106 within the pre-defined period of time. For example, the obligation amount was 200 dollars per month, the CP 102 adds two items in the product cart which collectively costs 20 dollars, and when the NCP 104 purchases the added two items for the CP 102, the obligation amount will be updated to 180 dollars per month.

Figure 2A:
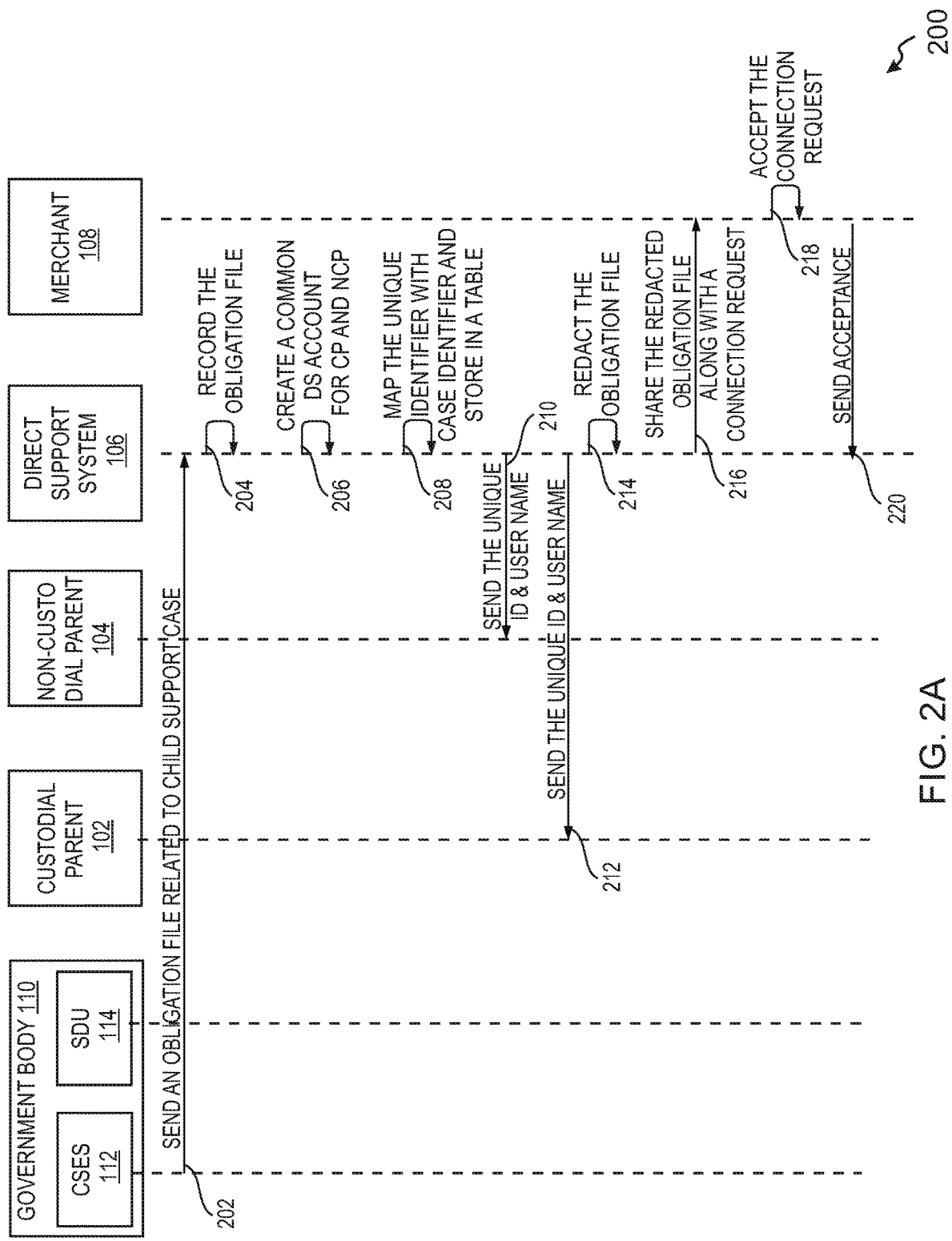
FIGS. 2A, 2B and 2C collectively illustrate a sequence flow diagram representing a method of enabling acknowledgment of exchange of goods or service between the custodial party and the non-custodial party under law enforced obligation agreement for child support, in accordance with an example embodiment.
Figure 2B:
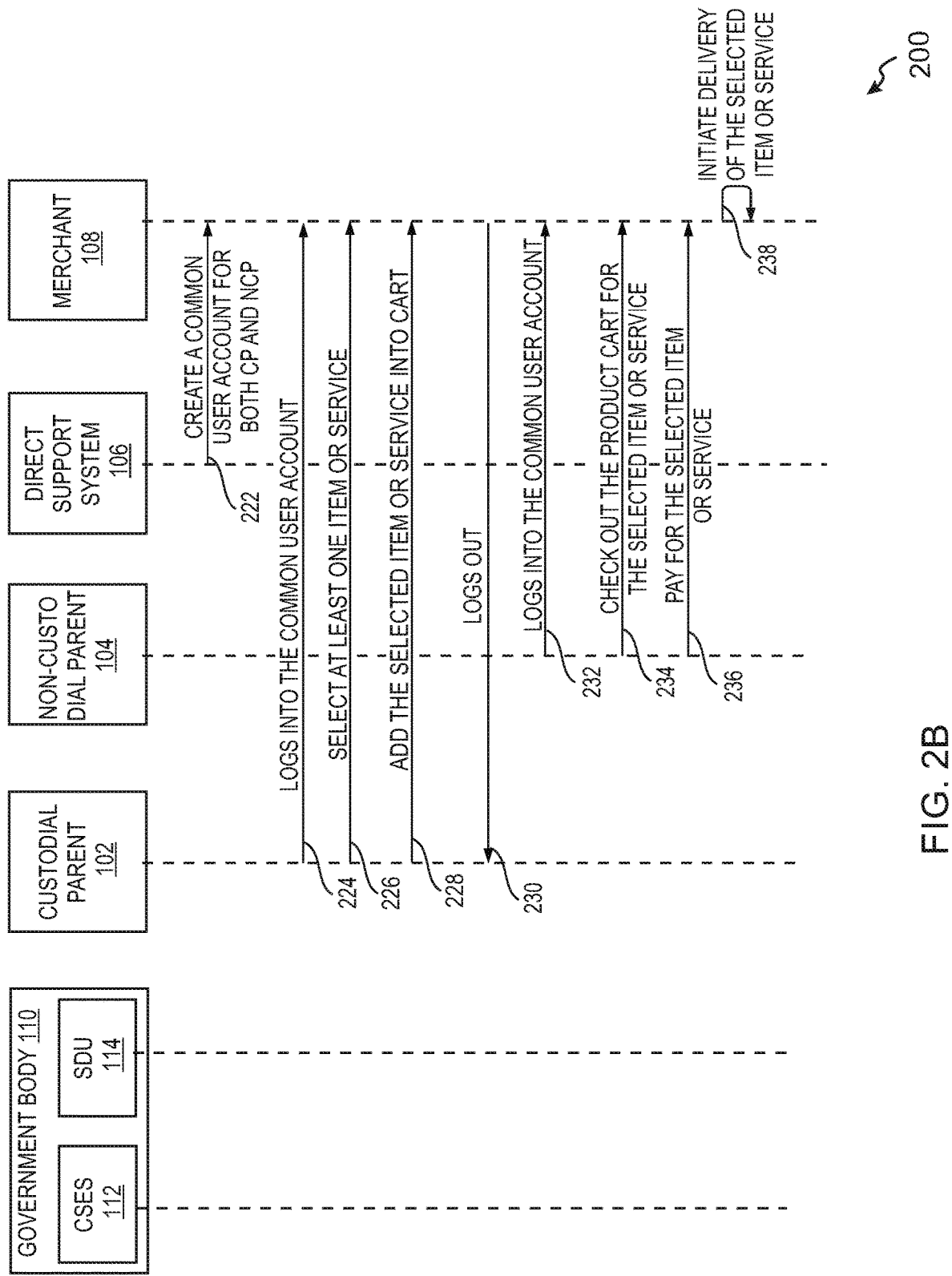
Figure 2C:
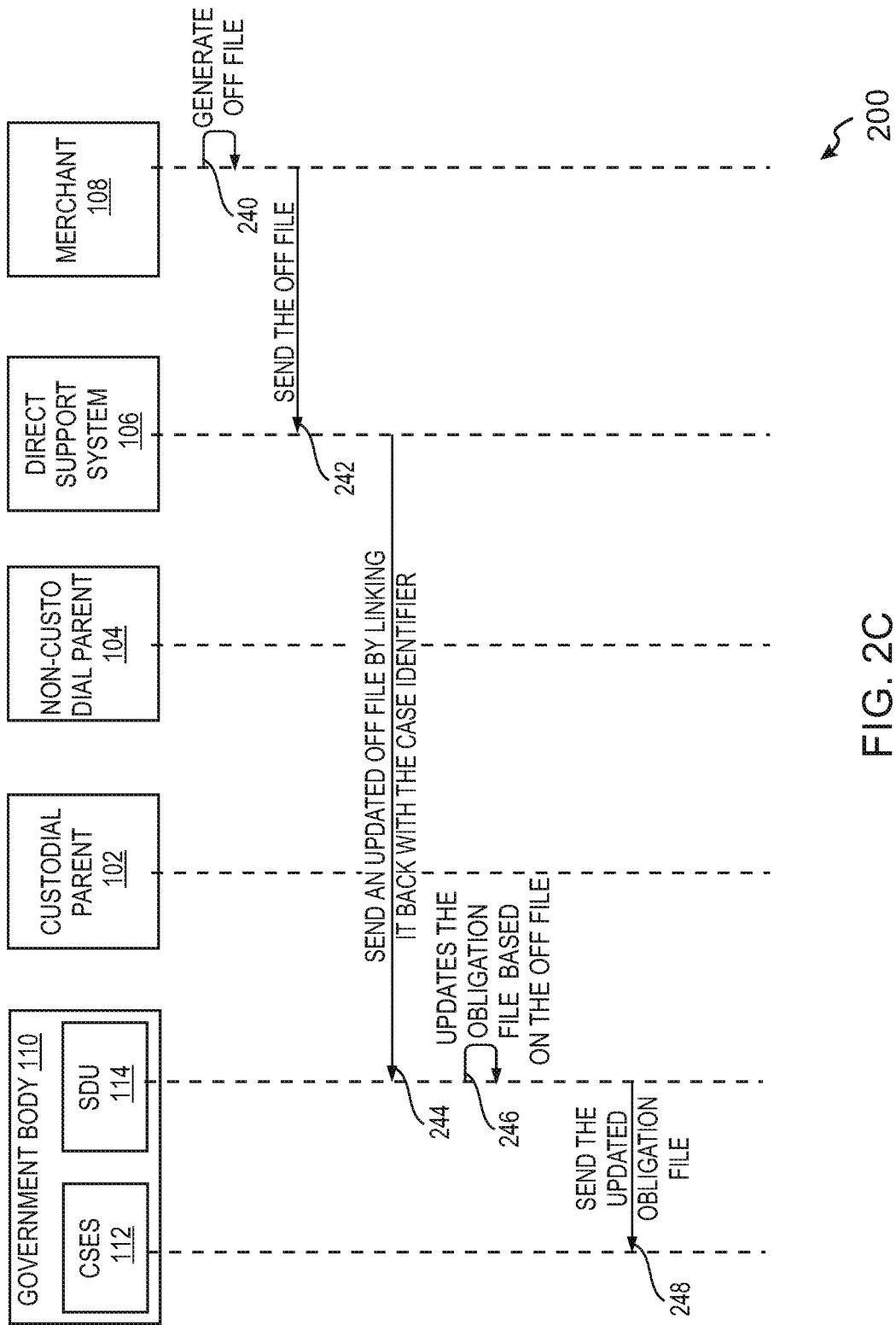

FIGS. 2A, 2B and 2C collectively illustrate a sequence flow diagram representing a method 200 of enabling acknowledgment of exchange of goods or service between the custodial party 102 and the non-custodial party 104 under law enforced obligation agreement for child support, in accordance with an example embodiment.

At 202, the CSES 112 sends an obligation file related to the child support case to the DS system 106. The obligation file includes information, such as a case identifier, an obligation amount, details of the CP, details of the NCP, details of the child, a date of creation of the obligation agreement, or a date of dissolution of the obligation agreement. At 204, records the obligation file in a database along with the case identifier.

At 206, the DS system 106 creates a common direct support (DS) account for both the CP 102 and NCP 104 based on the received obligation file by generating a DS account number (interchangeably termed as "unique ID") for both the CP 102 and the NCP 104 which is appended by the CP's name and the obligation amount.

At 208, DS system 106 maps the generated unique ID with the case identifier and stores in the database associated with the DS system 106. At 210, the DS system 106 sends the unique ID along with respective username to the NCP 104. At 212, the DS system 106 sends the unique ID along with respective username to the CP 102.

At 214, the DS system 106 generates a redacted obligation file from the obligation file shared by the CSES 112. The redacted obligation file is generated by removing some personal details of the CP 102 and the NCP 104 from the obligation file.

At 216, the DS system 106 sends the redacted obligation file to the merchant 108 along with a connection request to get linked with the DS system 106 under the child support program. At 218, the merchant 108 accepts the connection request.

At 220, the merchant 108 sends the acceptance to the DS system 106. The DS system 106 gets linked with the merchant 108. At 222, the DS system 106 creates a common user account for both the CP 102 and the NCP 104 with the merchant 108 for the purpose of enabling the NCP 104 to provide goods or services purchased from the merchant directly to the CP 102. However, the CP 102 and the NCP may also access the merchant website via the DS system 106.

At 224, the CP 102 logs into the common user account using the unique ID and the respective username. The username may be the name of the CP or an alphanumeric code generated by the DS system 106 specifically for CP 102. At 226, the CP 102 selects at least one item or service provided by the merchant 108 which is required for the child needs. At 228, the CP 102 adds the selected at least one item or service into a product cart of the common user account. At 230, the CP 102 logs out from the common user account.

At 232, the NCP 104 logs into the common user account using the unique ID and the respective username. The username may be the name of the NCP or an alphanumeric code generated by the DS system 106 specifically for NCP 104.

At 234, the NCP 104 checks the product cart of the common user account to view the at least one selected item or service added by the CP 102. At 236, the NCP 104 makes payment for the at least one item. The payment can be done using payment card (credit or debit), e-wallets, net-banking etc.

At 238, the merchant 108 initiates process of delivering the at least one item or service to the address of the CP 102.

At 240, the merchant 108 generates the OFF file related to the purchase of the items or services. The OFF file includes data elements such as CP/NCP identifiers, such as respective usernames, total payment amount, date of purchase and details of the items or services.

At 242, the merchant 108 sends the generated OFF file to the DS system 106. At 244, upon receiving the OFF file, the DS system 106 sends the updated OFF file to the SDU 114 or CSES 112 by linking it back with the case identifier.

At 246, the SDU 114 updates the obligation file based on the OFF file. The SDU 114 validates the details of the received OFF file and accordingly updates the respective obligation file based on the purchase amount spend the NCP 104 for the goods or services purchased from the merchant 108. At 248, the SDU d114 sends the updated obligation file to the CSES 112.

Figure 3:
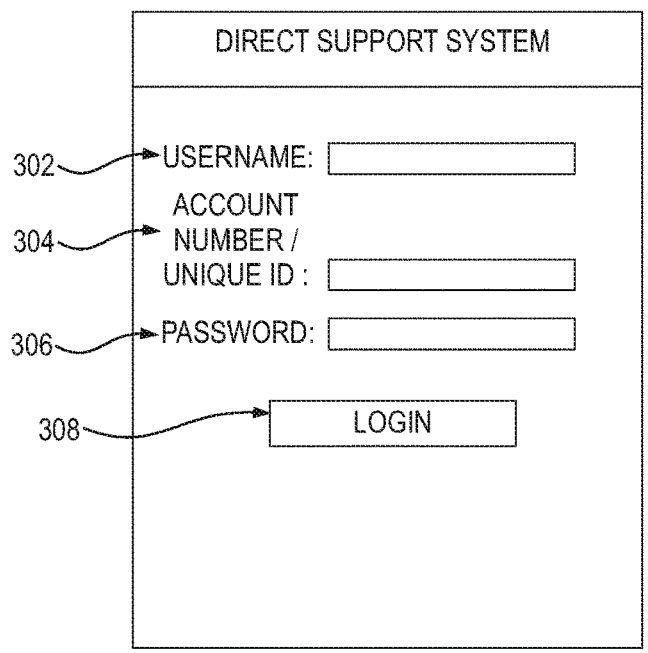
FIG. 3 illustrates an example representation of a user interface (UI) 300 displayed on a display screen of the user devices for logging the custodial party and the non-custodial party into the DS account created by the DS system, in accordance with an embodiment of the present disclosure.

FIG. 3 is an example representation of a user interface (UI) 300 displayed on a display screen of the user device 102a or 104a (as shown in FIG. 1) and configured to render input fields for logging the CP 102 or NCP 104 into the DS account created by the DS system 106, in accordance with an example embodiment of the present disclosure.

As shown in the UI 300, an input field "username" 302, and another input field "account number/unique ID" 304 are rendered on the display screen of the respective user device 102a or 104b. The CP 102 or NCP 104 logs into the DS account by filling the input fields 302 and 304. Another input field "password" 306 is also rendered for providing extra layer of protection. The CP 102 or NCP 104 during the registration created a password for password protection, therefore they will provide the correct password in the input field 306 for successful login. The CP 102 or NCP 104 clicks on the button "Login" 308 after filling all the input fields.

Figure 4:
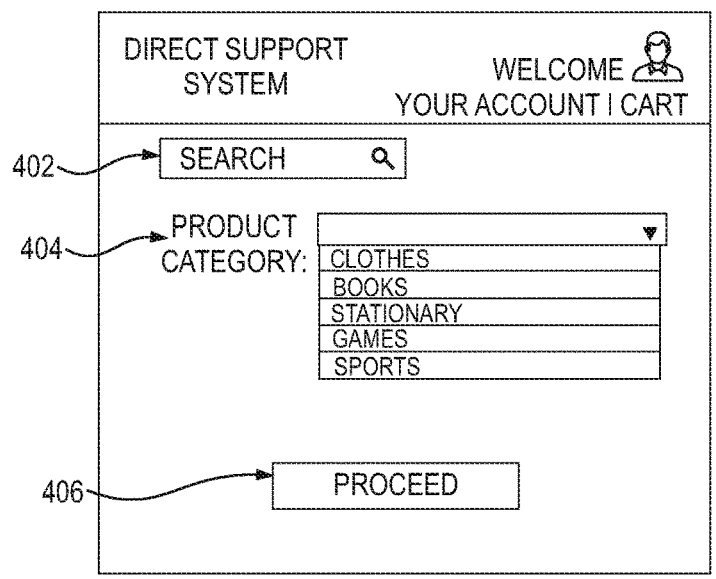
FIG. 4 illustrates an example representation of a UI displayed on the display screen of the respective user devices post successful login of custodial party and the non-custodial party into the DS account created by the DS system, in accordance with an embodiment of the present disclosure.

FIG. 4 is an example representation of a UI 400 displayed to the CP 102 or NCP 104 on the display screen of the respective user device 102a or 104a post successful login into the DS account created by the DS system 106, in accordance with an embodiment of the present disclosure.

As shown in the UI 400, a search field 402 is present which enables searching through the DS system 106 based on keyword entered by the CP 102. The UI 400 also includes a product search field 404 which has a drop-down list of types of product categories. The CP 102 can select one of the categories to refine the search. The DS system 106 includes links of plurality of merchants 108 for each product categories. The CP 102 can click on "proceed" button 406 to enable searching based on the search criteria selected by the CP 102.

Figure 5:
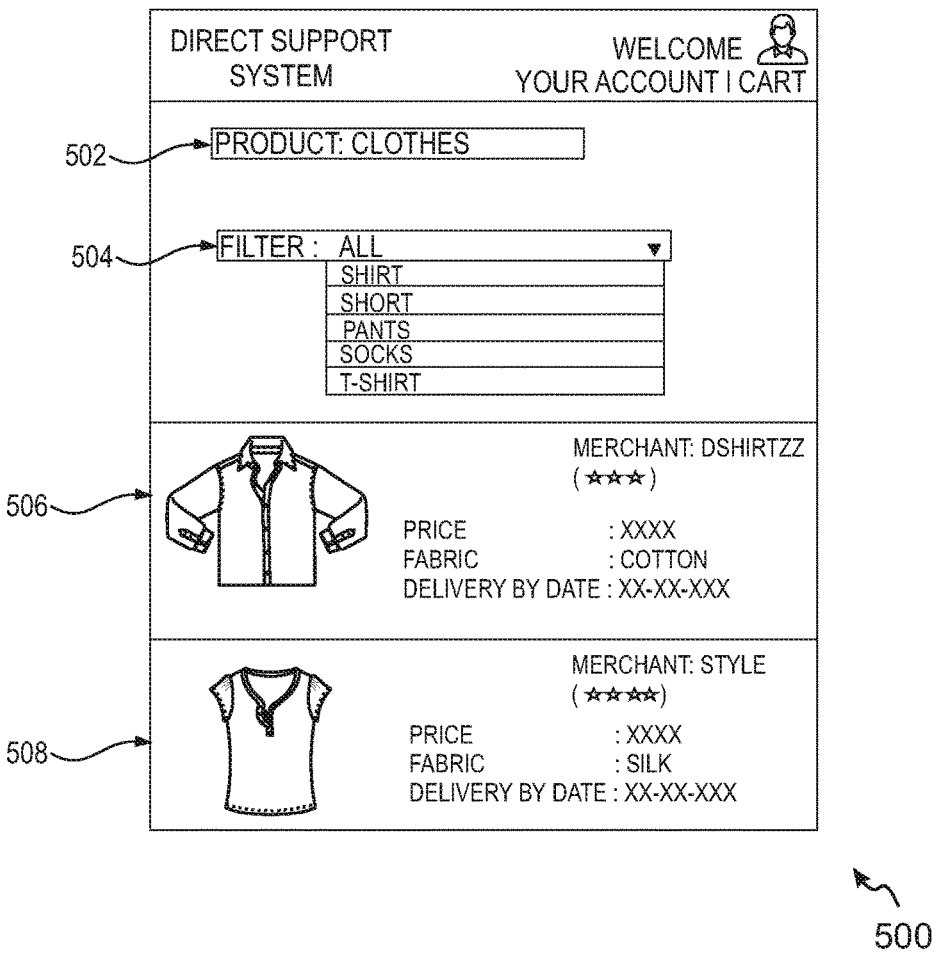
FIG. 5 illustrates an example representation of a UI displayed on the display screen of the respective user devices post selection of a product category by the custodial party, in accordance with an embodiment of the present disclosure.

FIG. 5 is an example representation of a UI 500 displayed on the display screen of the respective user device 102a or 104a post selection of a product category by the CP 102, in accordance with an example embodiment.

As shown in the UI 500, a product category "clothes" 502 is selected by the CP 102 and a filter 504 is rendered on the display screen which enables a specific search, for example, specifically for shorts or shirts. As shown in the UI 500, the filter option "All" is selected. Based on the product category "clothes" 502, two rows (506 and 508) including product's details along with their respective merchants is shown. The first row 506 shows a full-sleeved shirt sold by merchant "Dshirtzz" and the second row 508 shows a top sold by merchant "style". The rows (506 and 508) are active rows which redirects to the merchant website upon clicking on the respective row. For example, if the CP 102 clicks on the row 506 then it will be redirected to the merchant website "Dshirtzz" and if the CP 102 clicks on the row 508 then it will be redirected to the merchant website "style".

Figure 6:
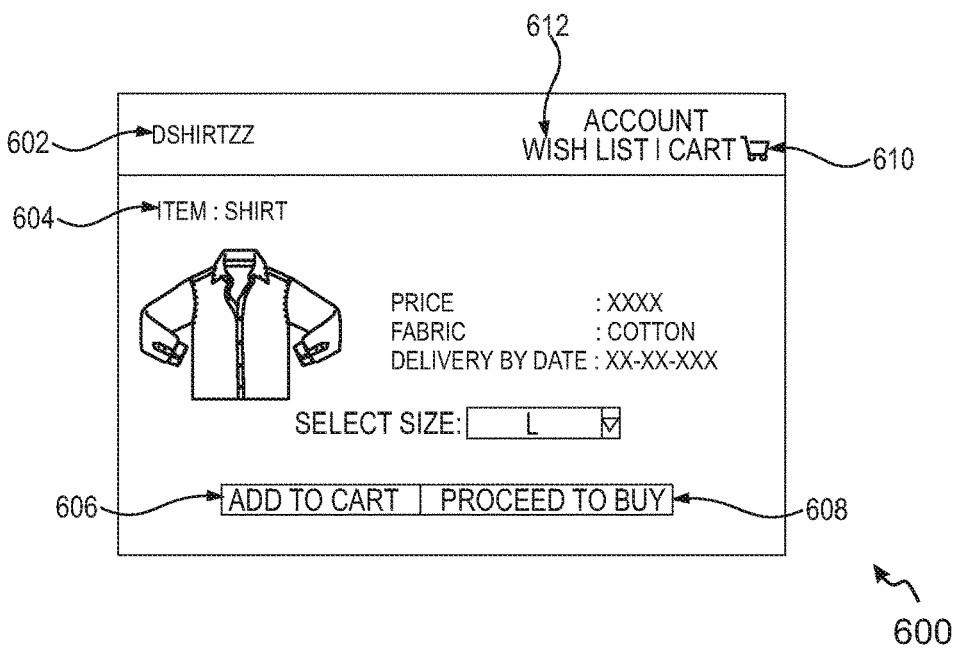
FIG. 6 illustrates an example representation of a UI displayed on the display screen of the respective user devices post selection of a product sold by a merchant, in accordance with an embodiment of the present disclosure.

FIG. 6 is an example representation of a UI 600 displayed on the display screen of the respective user device 102a or 104a post selection of a product sold by the merchant 108, in accordance with an example embodiment. The UI 600 is the merchant website page of the merchant 108 whose product is selected by the CP 102, i.e. the case where the CP 102 selects the row 506 shown in FIG. 5

As shown in UI 600, the merchant "Dshirtzz" 602 online website page for selected shirt 604 is rendered which includes details of the shirt, an expected date of delivery of the shirt to the delivery address, a drop down for selecting a size, a wishlist 612, a product cart 610, a click button "add to cart" 606 and a click button "proceed to pay" 608. The CP 102 can check the details of the shirt and then add the shirt into the product 610 by clicking on the button 606. The shirt will be added into the product cart 610.

Figure 7:
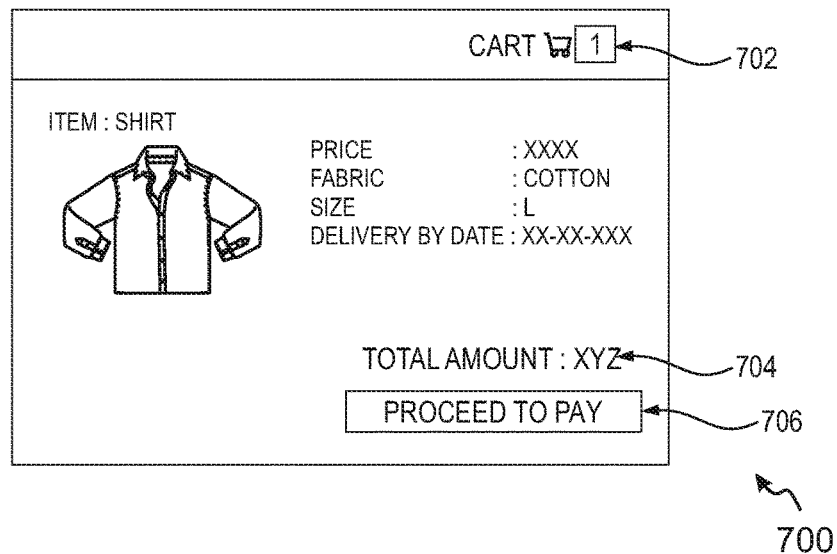
FIG. 7 illustrates an example representation of a UI displayed on the display screen of the respective user device post login of the non-custodial into the DS system and checking a product cart with the merchant, in accordance with an embodiment of the present disclosure.

FIG. 7 is an example representation of a UI 700 displayed on the display screen of the respective user device 102a or 104a post login of the NCP 104 into the DS system 106 and checking the product cart with the merchant 108, in accordance with an example embodiment of the present disclosure. When the NCP 104 logs into the DS account, the NCP 104 is automatically redirected to the merchant website in which the CP 102 added items.

As shown in the UI 700, the merchant "Dshirtzz" online page is shown which is showing the product "shirt" selected by the CP 102. The total payable amount 704 is shown. The NCP 104 can click on the button "proceed to pay" 706 to pay for the item in the product cart 702. Post selecting "proceed to pay" 706, the NCP 104 will be redirected to secure payment transaction portal for making the payment.

Figure 8:
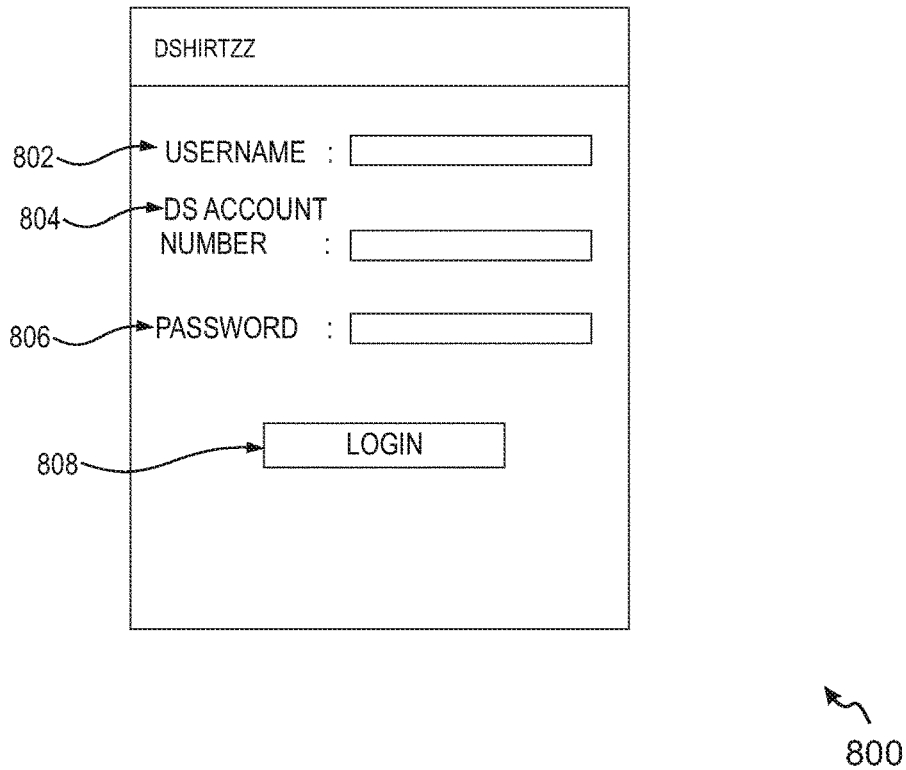
FIG. 8 illustrates an example representation of a UI displayed on the display screen of the respective user devices for logging into the merchant website directly, in accordance with an embodiment of the present disclosure.

FIG. 8 is an example representation of a UI displayed on the display screen of the respective user device 102a or 104a for logging into the merchant website directly using the unique ID and username, in accordance with an embodiment of the present disclosure.

As shown in FIG. 8, the UI 800 renders a user input field 802 for entering username, a user input field 804 for entering DS account number and a user input field 806 for entering the password. After filling all the user input fields, the login button 808 should be pressed for completing login process. When all the details are entered correctly, then the CP 102 or NCP 104 can access the merchant website for adding the product and purchasing the product. The steps of adding the product into the product cart and purchasing the product will remain same as shown in UI 600 and UI 700.

Figure 9:
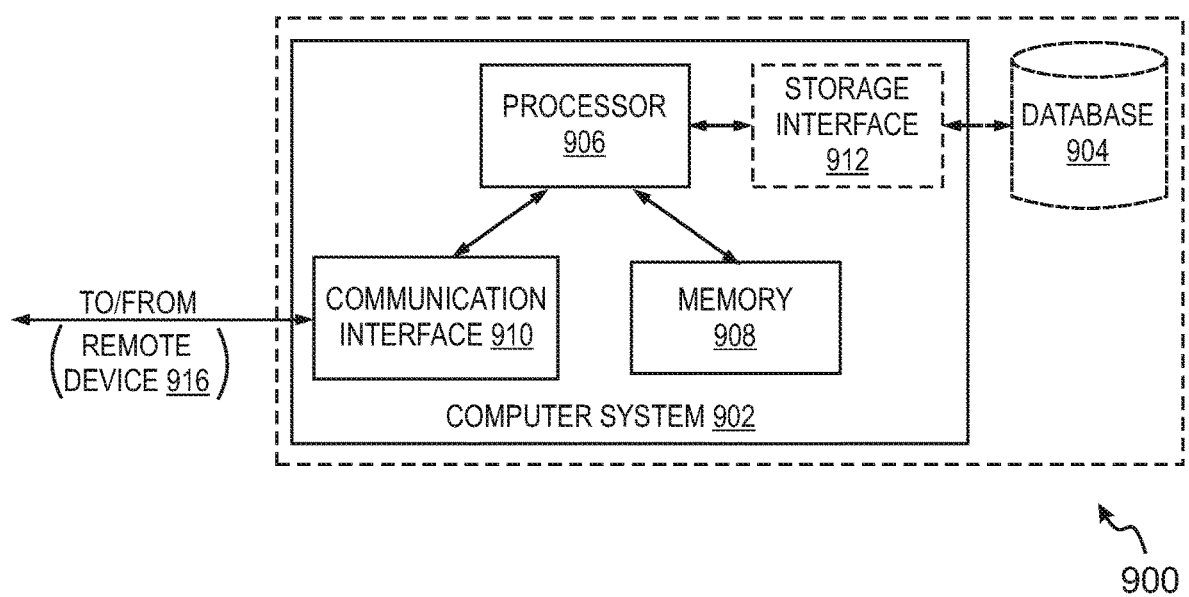
FIG. 9 illustrates a simplified block diagram of a system for facilitating a direct support service to the custodial party and the non-custodial party, in accordance with an example embodiment of the present disclosure.

FIG. 9 is a simplified block diagram of a server system 900 for facilitating a direct support service (e.g., acknowledgment of exchange of goods or service between the custodial party 102 and the non-custodial party 104 under law enforced obligation agreement for child support) to the CP 102 and the NCP 104, in accordance with an embodiment of the present disclosure. Examples of the server system 900 include, but not limited to, the DS system 106 illustrated in FIG. 1. The server system 900 includes a computer system 902 and a database 904.

The computer system 902 includes at least one processor 906 for executing instructions. Instructions may be stored in, for example, but not limited to, a memory 908. The processor 906 may include one or more processing units (e.g., in a multi-core configuration).

The processor 906 is operatively coupled to a communication interface 910 such that the computer system 902 is capable of communicating with a remote device 916, such as a merchant terminal (e.g., the merchant 108), a user device (e.g., the user device 102a or 104a), the CSES 112, the SDU 114, or communicates with any entity within the network 116. For example, the communication interface 910 may receive an obligation file from the CSES 112 related to a child support case. The CP 102 and NCP 104 gets registered with the server system 900. The communication interface 910 may receive a login request from the CP 102 or NCP 104 for accessing their DS account.

The processor 906 may also be operatively coupled to the database 904. The database 904 is any computer-operated hardware suitable for storing and/or retrieving data, such as, but not limited to, obligation file, a redacted obligation file, an obligation fulfilment file, obligation amount, case identifiers, usernames or unique IDs, or data relating to merchants.

The database 904 may also store information related to a plurality of child support cases. Each child support case includes at least one of a CP details, an NCP details, an obligation amount, a case identifier etc. The database 904 may also store information of a plurality of merchants, a plurality of merchant terminals installed at merchant facilities, such as merchant terminal ID, location of merchant terminals etc. The database 904 may include multiple storage units such as hard disks and/or solid-state disks in a redundant array of inexpensive disks (RAID) configuration. The database 704 may include any local or cloud based database. In one embodiment, the communication interface 910 includes a transceiver for wirelessly communicating information to, or receiving information from, the remote device such as CSES 112 or SDU 114 or other suitable display device, and/or another type of remote processing device. In another embodiment, the communication interface 910 is capable of facilitating operative communication with the remote devices and a cloud server using Application Program Interface (API) calls. The communication may be achieved over a communication network.

In some embodiments, the database 904 is a cloud based database, and the storage interface 912 may include a cloud interface for interfacing with the cloud based storage services. In some alternate or additional embodiments, the database 904 may be integrated within the computer system 902. For example, the computer system 902 may include one or more hard disk drives as the database 904. In other embodiments, the database 904 is external to the computer system 902 and may be accessed by the computer system 902 using a storage interface 912. The storage interface 912 is any component capable of providing the processor 906 with access to the database 904. The storage interface 912 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 906 with access to the database 904.

The processor 906 is configured to perform registration of the CP 102 and NCP 104 for the child support process in which good and services provided by the NCP 104 to the CP 102 by purchasing directly from the merchant are acknowledged under the obligation agreement. The processor 906 is configured to send connection request along with redacted obligation file of the child support case, via the communication interface 710, to the merchant 108 for making a link. The processor 906 is further configured to generate unique ID for both the CP 102 and NCP 104 for accessing a common DS account at the DS system 106 or a common user account at the merchant website.

The processor 906 is configured to enable the child support system to consider the purchase of good or service by the NCP 104 from a merchant 108 for the CP 102 as part of the obligation agreement based on creating a common account for both the CP 102 and NCP 104 for conducting the purchase of good and services.

Figure 10:
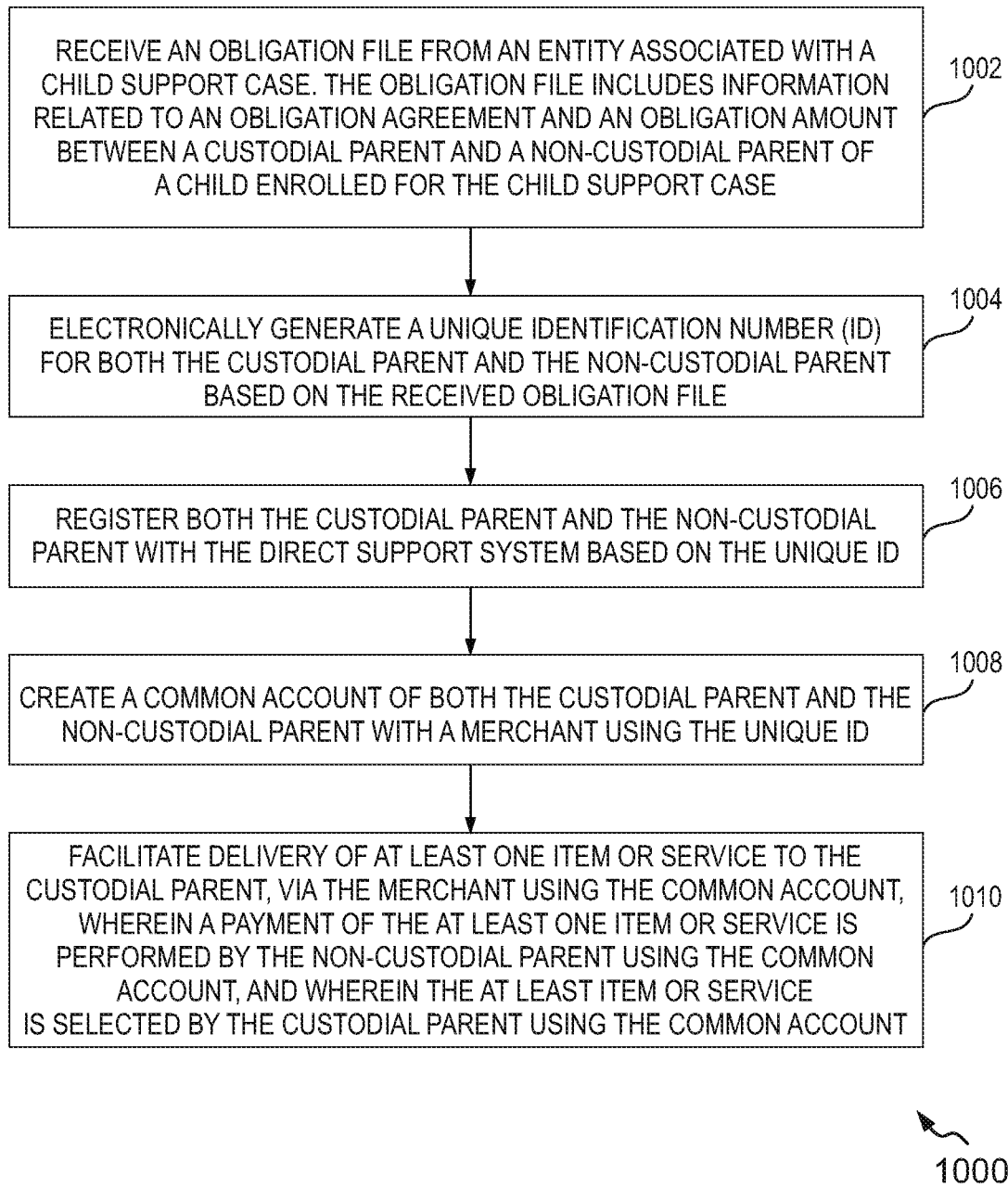
FIG. 10 illustrates a flow diagram representing a method of enabling acknowledgment of exchange of goods or service between the custodial party and the non-custodial party under law enforced obligation agreement for child support, in accordance with an example embodiment of the present disclosure.

FIG. 10 illustrates a flow diagram representing a method 1000 of enabling acknowledgment of exchange of goods or service between the custodial party 102 and the non-custodial party 104 under law enforced obligation agreement for child support, in accordance with an example embodiment of the present disclosure.

At step 1002, the method 1000 includes receiving an obligation file from an entity (for example, the CSES 112) associated with a child support case. The obligation file includes information related to an obligation agreement and an obligation amount between the CP 102 and the NCP 104 of the child enrolled for the child support case.

At 1004, the method 1000 includes electronically generating a unique identification number (ID) for both the custodial parent and the non-custodial parent based on the received obligation file. The unique ID is DS account number, for both the CP 102 and the NCP 104, which is appended by the CP's name and the obligation amount.

At 1006, the method 1000 includes registering both the custodial parent and the non-custodial parent with the direct support system based on the unique ID. At step 1008, the method 1000 includes creating a common account of both the CP 102 and the NCP 104 with a merchant 108 using the unique ID.

At 1010, the method 1000 includes facilitating delivery of at least one item or service to the CP 102, via the merchant 108 using the common account, wherein a payment of the at least one item or service is performed by the NCP 104 using the common account, and wherein the at least item or service is selected by the CP 102 using the common account.

Figure 11:
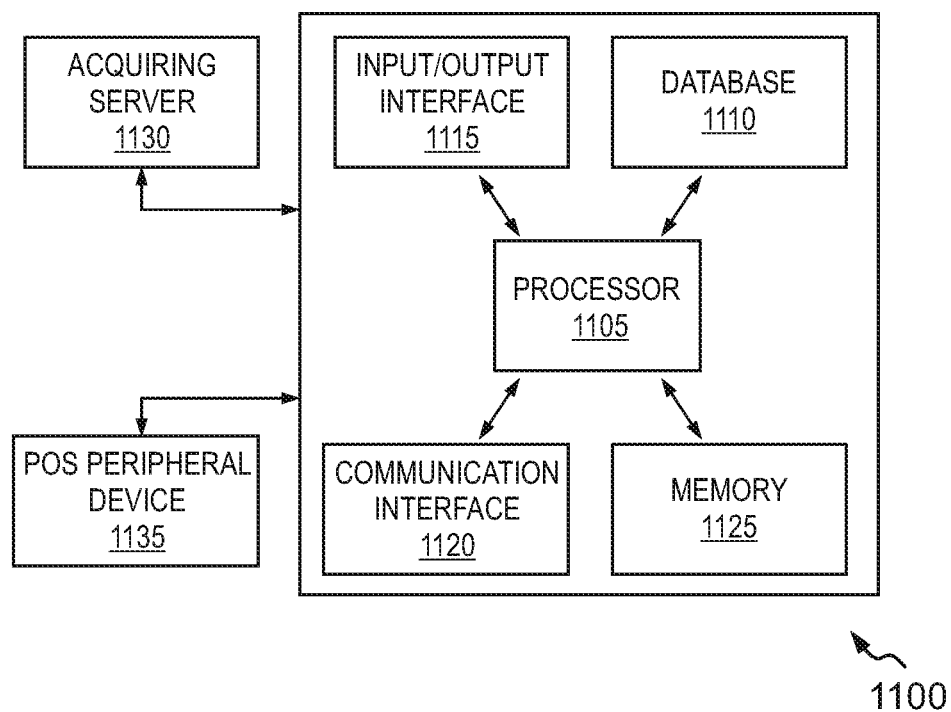
FIG. 11 is a simplified block diagram of a merchant terminal, in accordance with an example embodiment of the present disclosure.

FIG. 11 illustrates a simplified block diagram of a merchant terminal 1100 such as the merchant 108, in accordance with one embodiment of the present disclosure. The merchant terminal 1100 as explained herein is only one example of the merchant terminal of the merchant 108 of FIG. 1. In various embodiments, the merchant terminal 1100 can be a merchant mobile phone, a kiosk, a PDA, a merchant facilitated e-commerce website interface running on a computing device, and the like. The merchant terminal 1100 includes at least one processor 1105 communicably coupled to a database 1110, an Input/Output (I/O) interface 1115, a communication interface 1120 and a memory 1125. The components of the merchant terminal 1100 provided herein may not be exhaustive, and that the merchant terminal 1100 may include more or fewer components than that of depicted in FIG. 11. Further, two or more components may be embodied in one single component, and/or one component may be configured using multiple sub-components to achieve the desired functionalities. Some components of the merchant terminal 1100 may be configured using hardware elements, software elements, firmware elements and/or a combination thereof.

An I/O interface 1115 is configured to receive inputs from and provide outputs to the end-user (i.e. the merchant and/or the customer) of the merchant terminal 1100. For instance, the I/O interface 1115 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 1125 can be any type of storage accessible to the processor 1105. For example, the memory 1125 may include volatile or non-volatile memories, or a combination thereof. In some non-limiting examples, the memory 1125 can be four to sixty-four MegaBytes (MB) of Dynamic Random-Access Memory ("DRAM") or Static Random-Access Memory ("SRAM"). In addition, some examples may include supplementary flash memory installed via a PCMCIA slot.

The database 1110 is capable of storing and/or retrieving data, such as, but not limited to, smart card insertions, user/customer information, merchant information, payment strings uniquely associated with each user, touch-screen key depressions, keypad key depressions, number of dots printed by the slip and roll printers, check read errors, card swipes, such as, plurality of number pad values of the payment card and the like. Such information can be accessed by the processor 1105 using the communication interface 1120 to determine potential future failures and the like.

The merchant terminal 1100 is capable of communicating with one or more POS peripheral devices such as a POS peripheral device 1135, and an external server system such as an acquiring server 1130 via the communication interface 1120. The POS peripheral device 1135 can provide functionality which is used by a consumer at a merchant facility, such as PIN entry, merchant transaction amount entry, clear text entry, signature capture, and the like. Some non-exhaustive examples of the POS peripheral device 1135 include POS card reader device, barcode scanner, cash drawer, receipt printer, PIN pad, signature capture device, touch-screen, keyboard, portable data terminal, customer pole display and the like. In some embodiments, the merchant terminal 1100 may be mounted near a cash register at a check-out counter in the merchant facility, while the POS peripheral device 1135 may be mounted on the check-out counter such that it is accessible to the users. In this way, both the merchant and the user/customer can interact with similar devices to process the payment transaction.

The communication interface 1120 is further configured to cause display of user interfaces on the merchant terminal 1100. In one embodiment, the communication interface 1120 includes a transceiver for wirelessly communicating information to, or receiving information from, the acquiring server 1130 or other suitable display device, and/or another type of remote processing device. In another embodiment, the communication interface 1120 can facilitate operative communication with the remote devices and a cloud server using Application Program Interface (API) calls. The communication may be achieved over a communication network.

The processor 1105 is configured to send the transaction request received from the end-user via the communication interface 1120 to the acquiring server 1130 for processing the transaction. For example, the processor 1105 may be configured to receive the payment card information of the NCP 104, PIN, and the transaction amount via the POS peripheral device 1135. The processor 1105 can access the database 1110 to retrieve the user information and merchant information that are required to be sent along with the transaction request to the acquiring server 1130. The processor 1105 is configured to receive a redacted obligation file related to a child support case and store the redacted obligation file into the database 1110. The processor 1105 is further configured to authenticate login request from the CP 102 or NCP 104 based on the redacted obligation file or approval from the DS system 106. The processor 1105 is further configured to generate an obligation fulfilment file based on the payment done by the NCP 104 and the redacted obligation file details.

Additionally, the merchant terminal 1100 can include an operating system and various software applications that can provide various functionality to the merchant terminal 1100. For example, in some embodiments, the merchant terminal 1100 is addressable with an Internet protocol and includes a browser application. In such embodiments, the processor 1105 includes software adapted to support such functionality. In some embodiments, the processor 1105 executes software to support network management. In particular, this capacity allows software to be downloaded to a plurality of such systems to provide new applications such as application for enabling payment transactions using POS terminals and/or updates to existing applications. The operating system and software application upgrades are distributed and maintained through communication to the merchant terminal 1100 over the communication network.

Without in any way limiting the scope, interpretation, or application of the claims appearing below, a technical effect of one or more of the example embodiments disclosed herein is to provide methods and systems for means for NCPs to support their children (comply with support obligations) through direct purchases from suppliers and, more particularly to, methods and systems for enabling acknowledgment of exchange of goods or service between the custodial party 102 and the non-custodial party 104 under law enforced obligation agreement for child support in a more convenient and transparent manner. The embodiments of the present disclosure facilitate several advantages to the child as well as the non-custodial parent such as:

Receive child support assistance more quickly due to reduced time between origination of payment by NCPs and receipt of an actual benefit by the child Potential to increase compliance or receipt of the support payments Get more credit for indirect payment of child support Increased motivation to participate in child support program Improved visibility for spending of child support funds, e.g., funds can be tracked by what they are spent on (food, clothes, utility, school lunch, etc.) and not just by where they are spent (gas station, Dollar Store, etc.)

Enables NCPs to stay more engaged in their child's well-being

Strengthens the bond between NCPs and child/children

Hence, the present disclosure helps in improving the child support payment and disbursement processing by converting monetary payments into goods and services to be delivered to the child in fulfillment of the child support obligation.

The disclosed methods with reference to FIGS. 1 to 11, or one or more operations of the flow diagrams 200, and 1000 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system (e.g., the system 900) and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein.

In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer implemented method facilitated by a direct support system, comprising:
   receiving, by a processor, an obligation file from an entity associated with a child support case, the obligation file comprising information related to an obligation agreement and an obligation amount between a custodial parent and a non-custodial parent of a child enrolled for the child support case;
   electronically generating, by a processor, a unique identification number (ID) for both the custodial parent and the non-custodial parent based on the received obligation file from the entity and storing the obligation file in a database along with the case identifier;
   registering, by a processor, both the custodial parent and the non-custodial parent with the direct support system based on the unique ID;
   creating and linking, by a processor, a common account of both the custodial parent and the non-custodial parent with a merchant website using the unique ID; and
   facilitating, by a processor accessing the merchant website and selecting at least one item or service to the custodial parent and adding the selected item or service in a product cart of the merchant website using the common account, and wherein a payment of the at least one item or service is performed by the non-custodial parent using the common account by accessing the merchant website and checking in the product cart for the items and services added by the custodial parent to the common account.

2. The method according to claim 1, wherein the direct support system is communicatively coupled with the entity responsible for taking care of the obligation arrangement between the custodial parent and the non-custodial parent.

3. The method according to claim 2, wherein the entity updates the obligation amount in the obligation file and generates the updated obligation file within a pre-defined period of time.

4. The method according to claim 1, further comprising:
   generating a redacted obligation file from the obligation file based on eliminating personal information of the custodial parent and the non-custodial parent from the obligation file;
   and sending the redacted file along with a connection request to the merchant for setting a link with the merchant.

5. The method according to claim 1, further comprising facilitating selection of the at least one item or service by the custodial parent via an application hosted by the merchant by logging into the common account using the unique ID and a login credential.

6. The method according to claim 5, further comprising facilitating addition of the selected at least one item or service in a product cart in the common account via the application.

7. The method according to claim 1, further comprising receiving an obligation fulfillment file from the merchant based on the purchase of the at least one item or service, wherein the obligation fulfillment file comprises at least one of a unique identifier of both the custodial parent and the non-custodial parent, a purchase amount of the at least one item or service, a date of purchasing the at least one item or service, and details of the at least one item or service.

8. The method according to claim 7, further comprising:
   sending the obligation fulfillment file received from the merchant to the entity; and
   receiving an updated obligation file based on information of the obligation fulfillment file, wherein the updated obligation file includes an updated information related to the obligation agreement and the obligation amount corresponding to the child support case within a predefined period of time.

9. The method according to claim 8, further comprising storing the updated obligation file in a database.

10. A system comprising:
    a memory configured to store instructions; and a processor configured to execute the instructions stored in the memory and thereby cause the system to perform at least in part to:
    receive an obligation file from an entity corresponding to a child support case, wherein the obligation file comprises information related to an obligation agreement and an obligation amount between a custodial parent and a non-custodial parent of a child enrolled for the child support case; electronically generate a unique identification number (ID) for both the custodial parent and the non-custodial parent based on the received obligation file from the entity and storing the obligation file in a database along with the case identifier; register both the custodial parent and the non-custodial parent with the system based on the unique ID; create and link a common account of both the custodial parent and a non-custodial parent with a merchant website using the unique ID; and facilitate access to the merchant website and selection of at least one item or service to the custodial parent, and add the selected item or service in a product cart of the merchant website using the common account, and wherein a payment of the at least one item or service is performed by the non-custodial parent using the common account by accessing the merchant website and checking in the product cart for the items and services added by the custodial parent.

11. The system according to claim 10, further comprising a communication interface communicatively coupled with the entity responsible for taking care of the obligation arrangement between the custodial parent and the non-custodial parent.

12. The system according to claim 10, wherein the entity updates the obligation amount in the obligation file and generates the updated obligation file within a pre-defined period of time.

13. The system according to claim 10, wherein the processor is further configured to cause the system to:
generate a redacted obligation file from the obligation file based on eliminating personal information of the custodial parent and the non-custodial parent from the obligation file;
and send the redacted file along with a connection request to the merchant for setting a link with the merchant.

14. The system according to claim 10, wherein the processor is further configured to cause the system to facilitate selection of the at least one item or service by the custodial parent via an application hosted by the merchant by logging into the common account using the unique ID and a login credential.

15. The system according to claim 14, wherein the processor is further configured to cause the system to facilitate addition of the selected at least one item or service in a product cart in the common account via the application.

16. The system according to claim 10,
wherein the processor is further configured to cause the system to receive an obligation fulfillment file from the merchant based on the purchase of the at least one item or service, and wherein the obligation fulfillment file comprises at least one of a unique identifier of both the custodial parent and the non-custodial parent, a purchase amount of the at least one item or service, a date of purchasing the at least one item or service, and details of the at least one item or service.

17. The system according to claim 16, wherein the processor is further configured to cause the system to perform 1 at least in part to: send the obligation fulfillment file to the entity; and receive an updated obligation file based on information of the obligation fulfillment file from the entity, and wherein the updated obligation file includes an updated information related to the obligation agreement and the obligation amount corresponding to the child support case within a pre-defined period of time.

18. A computer implemented method facilitated by a direct support system, comprising:
receiving, by a processor, an obligation file from an entity associated with a child-support case, the obligation file comprising information related to an obligation agreement and an obligation amount between a custodial parent and a non-custodial parent of a child enrolled for the child support case; electronically generating, by a processor, a unique identification number (ID) for both the custodial parent and the non-custodial parent based on the received obligation file from the entity and storing the obligation file in a database along with the case identifier; registering, by a processor, both the custodial parent and the non-custodial parent with the direct support system based on the unique ID; generating, by a processor, a redacted obligation file from the obligation file based on eliminating personal information of the custodial parent and the non-custodial parent from the obligation file; sending, by a processor, the redacted file along with a connection request to a merchant website for setting a link with the merchant website; creating, by a processor, a common account of both the custodial parent and the non-custodial parent with the merchant website using the unique ID; and facilitating by a processor accessing the merchant website and selecting at least one item or service to the custodial parent and adding the selected item or service in a product cart, of the merchant using the common account, and wherein a payment of the at least one item or service is performed by the non-custodial parent using the common account by accessing the merchant website and checking in the product cart for the items and services added by the custodial parent.

19. The method according to claim 18, further comprising facilitating selection of the at least one item or service by the custodial parent via an application hosted by the merchant by logging into the common account using the unique ID and a login credential.

20. The method according to claim 19, further comprising facilitating addition of the selected at least one item or service in a product cart in the common account via the application.

* * * * *